(12) United States Patent
Dorstewitz

(10) Patent No.: US 7,306,417 B2
(45) Date of Patent: Dec. 11, 2007

(54) ROPE TIE-DOWN

(75) Inventor: Benjamin James Dorstewitz, 611 Lake St., Saint Joseph, MI (US) 49085

(73) Assignees: Edward Dorstewitz, Saint Joseph, MI (US); Benjamin James Dorstewitz, Saint Joseph, MI (US)

( * ) Notice: Subject to any disclaimer, the term of this patent is extended or adjusted under 35 U.S.C. 154(b) by 0 days.

(21) Appl. No.: 11/527,177

(22) Filed: Sep. 26, 2006

(65) Prior Publication Data

US 2007/0071568 A1    Mar. 29, 2007

Related U.S. Application Data

(60) Provisional application No. 60/720,527, filed on Sep. 26, 2005.

(51) Int. Cl.
*B60P 7/08* (2006.01)

(52) U.S. Cl. ........................................ 410/100; 410/97

(58) Field of Classification Search ................. 410/12, 410/96, 97, 100; 24/298–302, 265 CD; 248/499
See application file for complete search history.

(56) References Cited

U.S. PATENT DOCUMENTS

| | | | |
|---|---|---|---|
| 3,583,749 A | 6/1971 | Hopkins | |
| 3,718,947 A | 3/1973 | Huber | |
| 3,854,767 A | 12/1974 | Burnett | |
| 3,891,257 A | 6/1975 | Wilson | |
| 4,036,101 A | 7/1977 | Burnett | |
| 4,890,363 A | 1/1990 | Cross | |
| 5,699,657 A | 12/1997 | Paulson | |
| 2002/0090275 A1 * | 7/2002 | Zhan et al. | 410/100 |

* cited by examiner

*Primary Examiner*—Stephen Gordon
(74) *Attorney, Agent, or Firm*—Flynn, Thiel, Boutell & Tanis, P.C.

(57) ABSTRACT

An improved tie-down is provided have a self-locking lock arrangement formed in a loop of the tie-down rope so as to effect releasable locking of the rope at a readily adjustable length. The locking arrangement is formed by the rope itself rather than separate mechanisms and provides an improved arrangement for securing cargo.

20 Claims, 7 Drawing Sheets

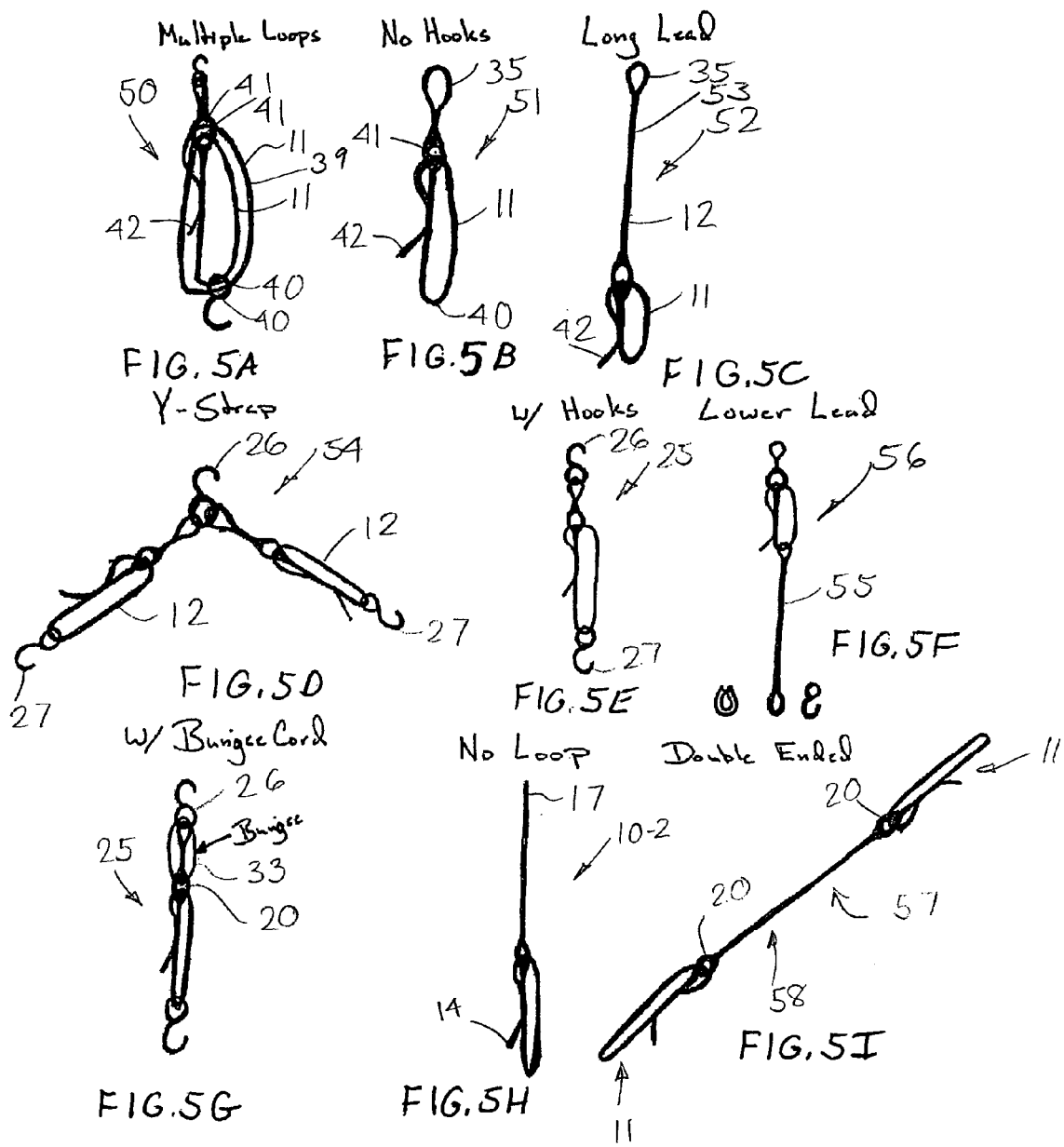

1. Cut to Length

2. Eye Splice One End

3. Form Hole in Splice and insert thimble/grommet/etc.

4. Insert End through Hole

5. Run Line through Rope & Out

Separating Tools

Scissor Type

Split Spike Type

Solid Spike Type

Grommet Spike & Installer

ROPE TIE-DOWN

CROSS REFERENCE TO RELATED APPLICATIONS

This application claims the benefit of U.S. Provisional Application Ser. No. 60/720 527, filed Sep. 26, 2005, which is incorporated herein by reference in its entirety.

FIELD OF THE INVENTION

The invention relates to tie-down ropes for cargo and the like, and more particularly to a rope tie-down have an improved constrictive lock arrangement which self-lockingly locks the rope in a tightened condition yet is readily releasable.

BACKGROUND OF THE INVENTION

Tie-down ropes have been provided in many configurations for the purpose of securing cargo and articles to a support platform, such as the bed of a truck, trailer or the like.

The invention relates to an improved tie-down have a constrictive lock arrangement formed in a loop of the tie-down rope so as to effect releasable locking of the rope at a readily adjustable length. The locking arrangement is formed by the rope itself rather than separate mechanisms and is self-locking to provide an improved arrangement for securing cargo.

Other objects and purposes of the invention, and variations thereof, will be apparent upon reading the following specification and inspecting the accompanying drawings.

DESCRIPTION OF DRAWINGS

FIG. 5A illustrates a multi-loop configuration.

FIG. 5B illustrates a hook-free configuration.

FIG. 5C illustrates a tie-down configuration with a long upper lead.

FIG. 5D illustrates a Y-strap configuration.

FIG. 5E illustrates a tie-down configuration with hooks similar to the tie-down of FIG. 4.

FIG. 5F illustrates a tie-down configuration with a lower lead.

FIG. 5G illustrates a tie-down configuration including a bungee therein for comparison with the configurations of FIGS. 5A-5F and 5H-5I.

FIG. 5H illustrates a hook-free configuration like that of FIG. 3.

FIG. 5I illustrates a double-ended configuration.

Figure 1:
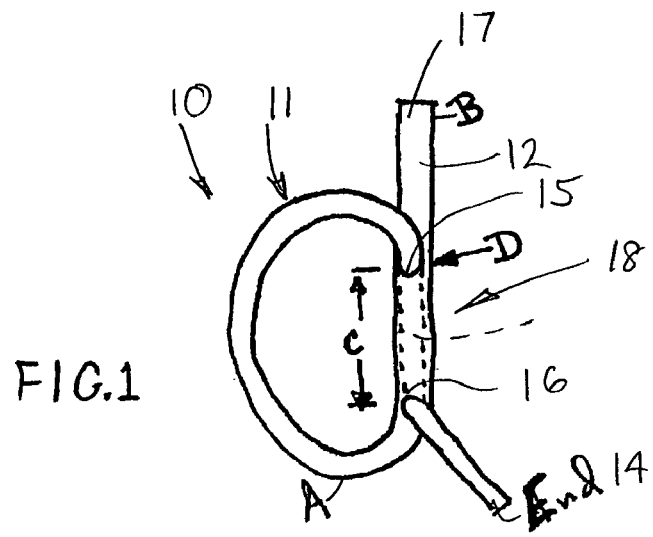
FIG. 1 illustrates a rope tie-down in a loop form.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

1. Basic Description

Generally, the product of the invention is a piece of rope 12 that can be adjusted to variable lengths. Adjustment is quick, easy and involves no moving parts. The way the rope is assembled allows all of these attributes to benefit this product with few to zero hardware on the finished piece.

2. Advantages

Since this tie-down has no moving parts and makes use of only very basic hardware, its strength can be increased at very little expense, and the full strength of the rope can be used without bulky and expensive hardware.

3. Basic Construction and Evolution

Referring to FIG. 1, the tie-down 10 in its most basic form is a loop 11 of rope 12 with the end 14 of the rope 12 traveling down through the start 15 of the loop 11 at point D and then exiting at point 16. (FIG. 1)

3.1 Locking Mechanism

The end 17 traveling through and away from the start of the loop 11 forces the rope 12 to constrict around the end 14 going internally through locking section or region C when tension is applied between points A and B. This is the locking mechanism or arrangement 18 utilized by this tie-down 10 and all variations disclosed herein and since the arrangement or mechanism 18 is the rope 12 itself, no hardware is required to make one, although some hardware may be included depending upon the tie-down configuration being formed.

Lock Deformation

Figure 2:
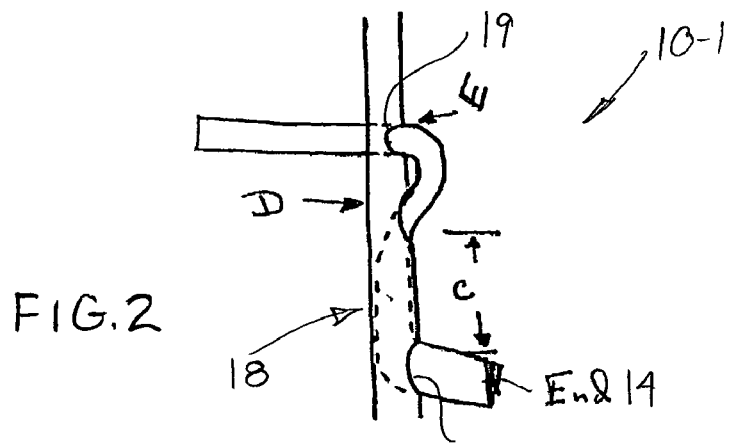
FIG. 2 illustrates a modified loop configuration.

This most basic version of the rope locking system (FIG. 1) demonstrates the point, however, under load the lock 18 will possibly deform and eventually fail or experience unnecessary wear. Therefore it is beneficial to have some system to keep the end 17 of the rope oriented in the same direction just above point D where it enters the locking arrangement 18. (FIG. 2) For this reason, in tie-down 10-1 of FIG. 2, the end of the rope travels perpendicularly through a hole 19 at the point E at the start of the loop 11 before entering the rope 12 and passing through locking region C.

Figure 3:
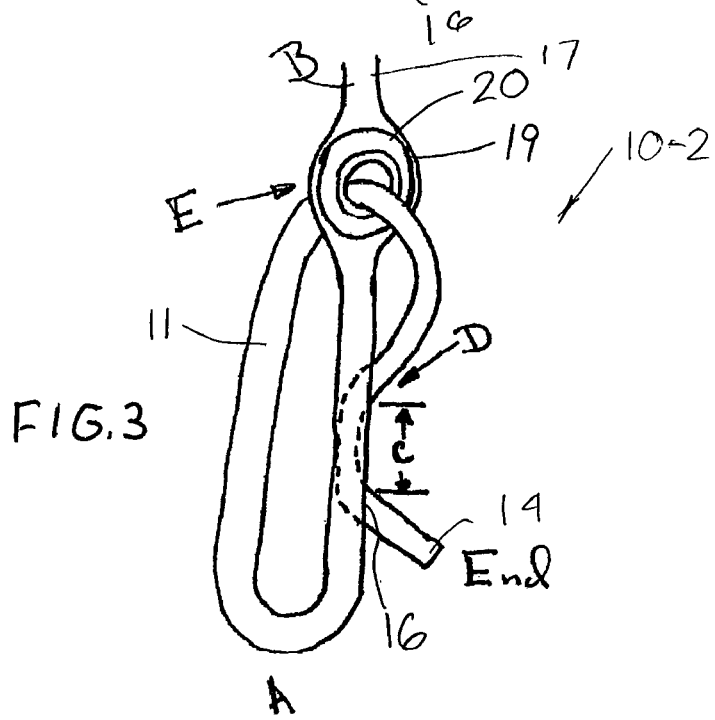
FIG. 3 illustrates a further modified loop configuration of a preferred form of the tie-down of the invention.

More particularly as to FIG. 3, at this stage it is also advantageous to insert a device 20 into the start of the loop 11 at point E that will keep that hole 19 open as well as disperse the load that will be applied to that point to form the configuration of tie-down 10-2. This device 20 also reduces wear from the rubbing that is experienced at that point. A thimble or grommet are two such devices 20 that have been successfully used to date.

3.2 Final Basic Construction

In summary, the basic mechanism for the inventive tie-down consists of a loop 11 of rope 12 in which the end of the rope 14 travels perpendicularly through the start of the loop (E) before entering in the rope (D) traveling a certain distance through locking section (C) and exiting from the exit hole 16. (FIG. C)

3.3 Exemplary Hooked Tie-Down Configuration

Figure 4:
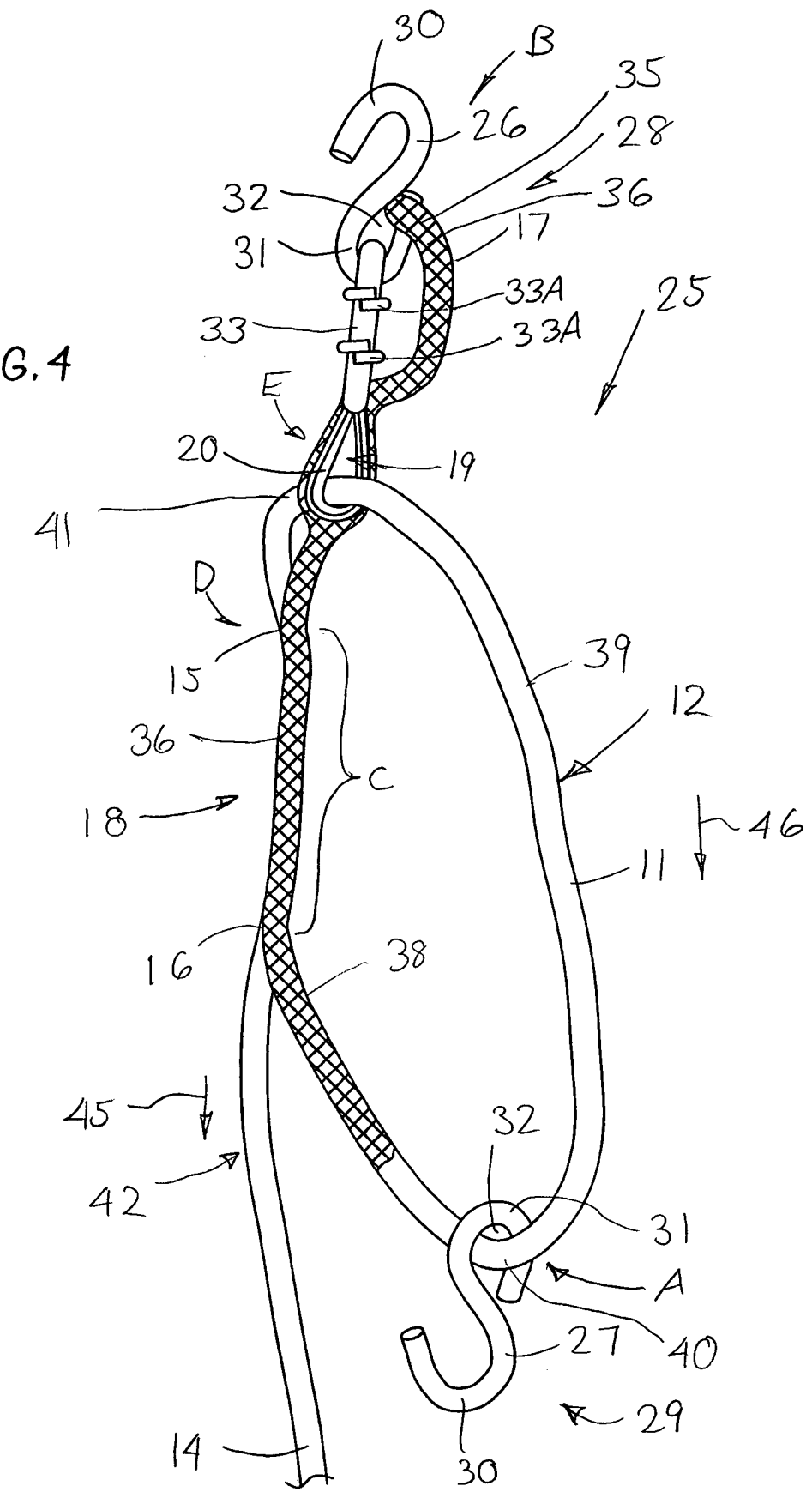
FIG. 4 illustrates a preferred multi-hook configuration of the inventive tie-down.

More particularly, one preferred tie-down configuration is the tie-down 25 illustrated in FIG. 4. This basic tie-down configuration is essentially formed by the self-locking tie-down configuration of FIG. 3, except that a pair of end connectors or anchors are provided in the form of rigid metal hooks 26 and 27 that are included at opposite ends 28 and 29.

As to the hooks 26 and 27, each hook 26 and 27 is formed the same so as to include an open hook section 30 which joins integrally with a connector eyelet 31. Each eyelet 31 thereby forms an eyelet opening 32 through which respective sections of the rope 12 pass as discussed further below.

Figure 6A:
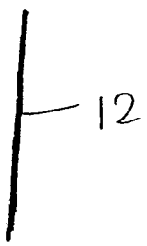
FIG. 6A-6E illustrates the multiple steps in performing the basic tie-down construction.
Figure 6B:
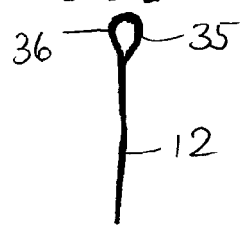

As to the configuration of the rope 12, this rope 12 is formed of a hollow braided rope that preferably is an eight (8) plait polypropylene rope wherein the interior thereof forms the locking section C. Referring to FIG. 4 as well as the assembly steps of FIGS. 6A-6E, the rope 12 is first cut to a desired length (FIG. 6A). Then, an eye-splice 35 (FIG. 6B) is formed at the end 17, which eye-splice 35 forms a connector loop 36 that is fixed through the eyelet opening 32 of the hook 26 so as to fixedly secure the rope 12 to the hook 26. An additional tensioning ring 33 is also provided which preferably is stretchable and elastic, such as a bungee cord, so as to provide consistent tension on cargo without excessive force and to also take-up or carry some of the rope load and reduce the tension load on the eye-splice 35. The ring 33 preferably is formed of a length of bungee cord wherein the free ends are held together by compression clips 33A to form an endless deformable loop or ring.

Figure 6C:
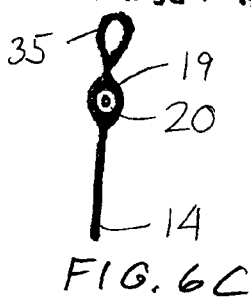
Figure 6D:
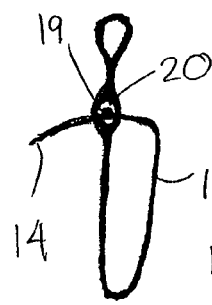
Figure 6E:
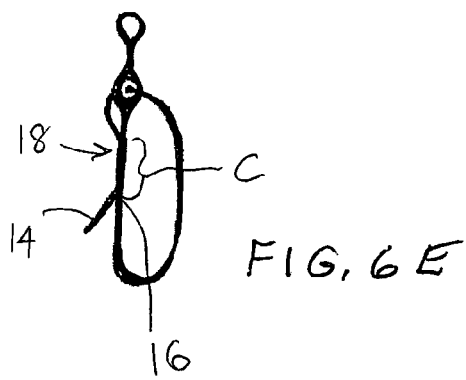

Referring to FIGS. 4 and 6C, the hole 19 is then formed through the strands of the rope 12 and the device 20 such as the grommet or thimble is secured in the rope 12. As seen in FIG. 6D, the free end 14 of the rope 12 is then threaded through the hole 19 defined through the device 20 wherein the rope 12 is freely slidable through the hole 19.

Thereafter, the strands of the rope 12 are parted to form the entrance opening 15 through which the rope end 14 is inserted interiorly and longitudinally through the rope 12 along the length of section C. The rope end 14 then exits from the rope interior through the opening 16 which is again defined by parting the rope strands. Where the rope 12 passes interiorly through section C, the outer strands 36 of the rope 12 are depicted in FIG. 4 as surrounding the interior section of the rope 12 along section C. Generally upon pulling oppositely on points A and B, it is noted that the rope 12 is placed in tension, thus causing the outer exterior strands 36 to constrict around the interior section of rope 12 in locking section C, which thereby grabs and locks the interior rope 12 within section C. As such, section C is longitudinally elongate and defines the locking arrangement 18.

More particularly, the rope 12 of FIG. 4 thereby comprises a first fixed leg 38 which extends away from the first hook 26. This fixed leg 38 has the locking section C formed interiorly therein along a longitudinal portion thereof. The rope 12 after exiting from locking section C is then looped backwardly into a second return leg 39 that extends parallel to the fixed leg 38 to define the loop 11. The parallel legs 38 and 39 formed a turn or corner 40 at the point at which the rope 12 slidably passes through the second hook 27. As will be described, the distance between the hooks 26 and 27 thereby is adjustable to vary and permit adjustment of the overall length of the tie-down 25.

The return leg 39 again turns at turn or corner 41 at the point at which the rope 12 passes through the device 12. After corner 41, the rope 12 then defines an end leg 42 which extends interiorly through the section C and is freely slidable through the locking section C when adjusting the length of the tie-down 25.

Because of the constriction created by the outer rope strands 36 in locking section C, any tension placed on the tie-down by pulling on the end leg 42 (arrow 45) and shortening of the tie-down length causes the locking section C to constrict and secure the rope 12 within the interior of fixed leg 38. The end leg 42 may be pulled with sufficient force through the locking section C, but upon release of the leg 42, the constriction prevents the tie-down from loosening. As such the overall length of the tie-down 25 may be readily shortened by pulling end leg 42, and the tie-down 25, when tensioned, is automatically locked at this length when the end leg 42 is let go or no longer pulled.

To release the tie-down 25, the return leg 39 is merely pulled longitudinally away from the locking section C in the direction of arrow 46. This longitudinally pulling only on the one return leg 39 is permitted without significant effort and causes the end log 42 to then slide in the direction opposite to the tightening direction 45. As such, when both legs 38 and 39 are under load, the locking arrangement 38 is effective and self-locking. Pulling on the one end leg 42 actually allows sliding to tighten the tie-down such as against cargo, yet release of the end leg 42 allows the locking section C to remain constricted and effective. However, pulling the return leg 39 by itself actually pulls the end leg 42 back through the locking section C even when the strands are constrictively holding the end leg 42, such that the return leg 39 defines the release arrangement for the tie-down 25.

With this arrangement, the tie-down 25 is readily adjustable and automatically locked merely by pulling on one leg of the rope and readily released when pulling on another leg. In testing, it has been found that the rope 12 has broken under tension before the locking arrangement 18 gave way or failed, such as through undesirable slippage of the end leg 42 through the locking section C.

4. Variations

There are many different variations of the inventive tie-down and all have this locking mechanism in common. FIGS. 5A to 5I are devoted to several illustrations describing some of the different possibilities for applications of the inventive tie-down.

4.1 Multiple Loops (FIG. 5A): The purpose of adding more loops 11 to the tie-down 50 is to provide more purchase on the system. One loop 11 (FIGS. 4 and 5E) provides a 3:1 ratio, two 11 (FIG. 5A) provides 5:1, three provides 7:1 and so on. The tie-down 50 is released merely by longitudinally pulling the return leg 39 closest to the locking arrangement 18.

4.2 No Hooks (FIG. 5B): A tie-down 51 with just an eye splice 35 at the top and no hooks 26 or 27 allows for more freedom to attach to objects that a hook might not reach around.

4.3 Long Lead (FIG. 5C): In tie-down 52, having a long lead 53 at the top allows several things: 1) a hook at the top can be looped around a large object and then hooked onto the lead somewhere; 2) The lead 53 may be tied around something; and 3) Less rope 12 can be used to make this tie-down 52 since there is less rope that can be adjusted.

4.4 Y-Strap (FIG. 5D): The Y-Strap 54 comprises two single-loop ropes 12 connected between one top hook 26 and two respective bottom hooks 27 and thereby can be used to cartop any thing quickly, securely, and easily.

4.5 Tie-down w/Hooks (FIG. 5E): Hooks 26 and 27 at both ends makes this tie-down 25 perform like other tie-downs except more efficiently.

4.6 Lower Lead (FIG. 5F): Having a lead 55 attached to the bottom of the tie-down 56 allows the same capabilities as a lead 53 at the top.

4.7 Tie-down w/Bungee Cord (FIG. 5G): Elastic 33 is attached between the grommet/thimble device 20 and the top of the tie-down 25 which provides consistent tension on cargo without excessive force.

4.8 No Loop (FIG. 5H): A tie-down 10-2 without a loop or hook at the ends 14 and 17 can be tied to anything.

4.9 Double Ended (FIG. 5I): The double ended tie-down 57 can be equipped with a grommet(s) or thimble(s) 20 in the center 58 to form two loops 11 for any number of applications that require several attachment points.

5. Step-by-Step Guide to Construction

The most important steps to construction of a inventive tie-down are illustrated in FIGS. 6A-6E and are described above.

6. Tools

Figure 7A:
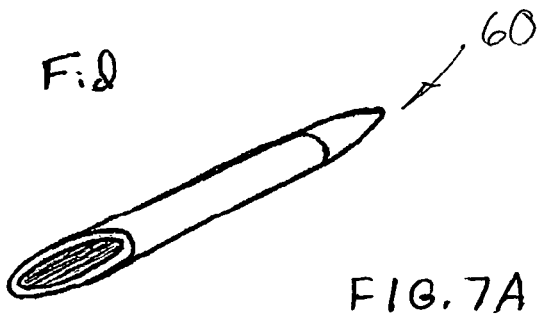
FIGS. 7A-7E illustrate various assembly tools.
Figure 7B:
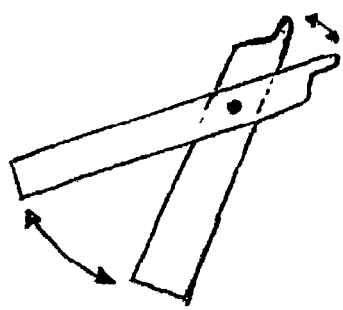
Figure 7C:
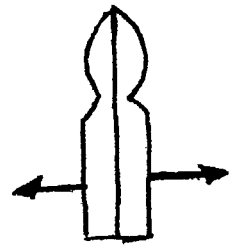
Figure 7D:
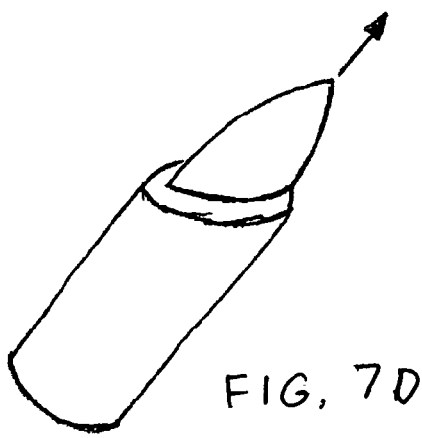
Figure 7E:
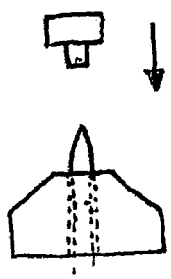

FIGS. 7A-7E illustrate the tools used to construct an inventive tie-down. The separating tool can take several different forms and is unique to this tie-down construction. For example, FIG. 7A illustrates a fid; FIG. 7B illustrates a scissor type tool; FIG. 7C illustrates a split spike type tool; FIG. 7D illustrates a solid spike type tool; and FIG. 7E illustrates a grommet spike and installer tool.

7. Uses for the Tight Rope tie-down

Being a tie-down, the inventive tie-down according to the various embodiments hereof has unlimited uses in everyday life. Of particular importance is the strength and reliability of this tie-down. Several applications are illustrated in FIGS. 8A-8C.

Figure 8A:
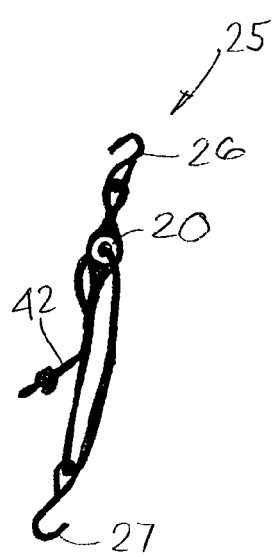
FIGS. 8A-8C provides a functional comparison of different tie-down configurations.

For example, FIG. 8A illustrates a basic tie-down 25 which includes the hooks 26 and 27 serving as connector parts at the opposite tie-down ends that may then be hooked onto support structure such as eyelets or other anchors on a vehicle. The hooks 26 and 27 may be engaged with such support structure with the tie-down 25 being laid over the cargo or other secured article and then tightened by pulled on the end leg 42. The tie-down 25 is released by pulling the return leg 39 as described above.

Figure 8B:
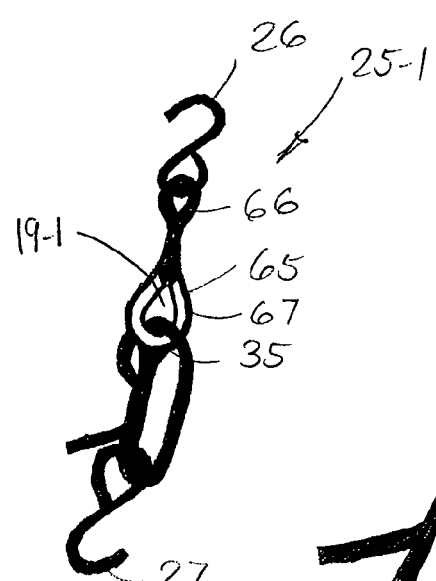

As to FIG. 8B, a heavy duty tie-down 25-1 is shown. This tie-down 25-1 includes an intermediate connector 65 between the eye-splice 35 and the hook 26. This intermediate connector 65 has a first eyelet 66 engaged with the eyelet 31 of the hook 26, and a second eyelet 67 to which the eye splice 35 is secured and through which the rope 12 is slidably received. As such, the second eyelet 67 is an alternative device which serves the same function of the device 20 described above except that it is not necessary to form the hole 19-1 in the rope 12 itself like the above-described hole 19.

Figure 8C:
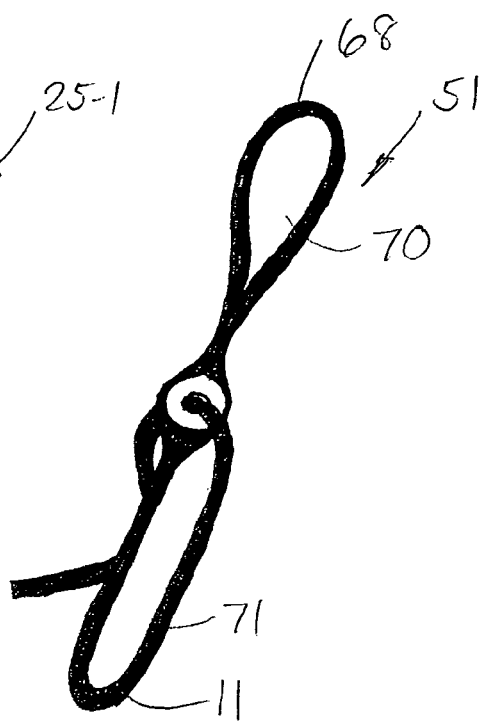

As to FIG. 8C, the illustrated tie-down 51 is readily usable as a tow strap for towing vehicles. In particular, the tie-down 51 may be formed with smaller rope to primarily function as a tie-down or with thicker heavy-duty rope to more readily accommodate use as a tow strap and carry the high loads associated therewith. It is therefore understood that the configuration of tie-down 51 is usable for either situation. This tie-down 51 is best adapted for use as a tow strap since it is formed with a first connector loop 68 forming a connector 70 at the one end opposite to the loop 11 which forms the second connector 71. These connectors 70 and 71 may looped over vehicle frame structure on two vehicles such as a tow hook on the end of the towed vehicle and similar structure on the adjacent towing vehicle.

Figure 9:
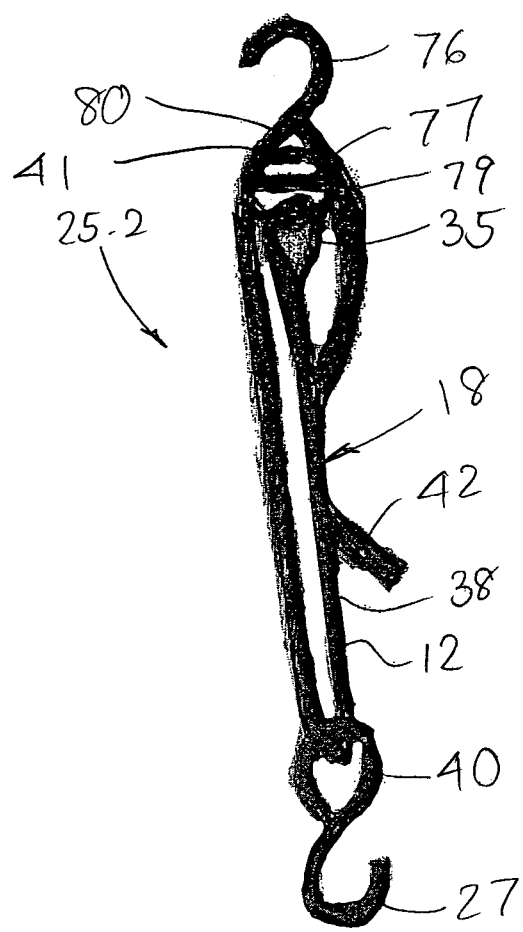
FIG. 9 features a modified tie-down configuration.
Figures 10A, 10B:
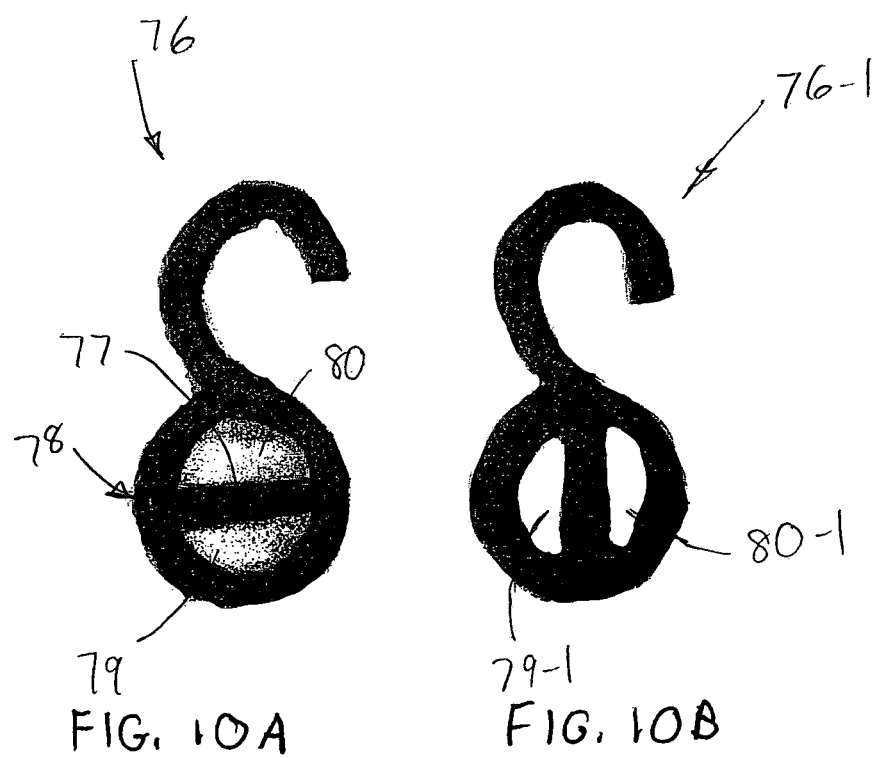
FIGS. 10A and 10B illustrate modified hooks for the tie-down of FIG. 9.

Another variation of the invention is illustrated in FIGS. 9 and 10A, wherein the tie-down 25-2 is formed similar to tie-down 25 described above. The most significant difference is that the top hook is formed as hook 76 which includes a separator bar 77 formed within the eyelet 78 to form a first eyelet opening 79 and an adjacent second opening 80. The first opening 79 has the eye-splice 35 attached thereto like that described above, with the rope 12 continuing down to the bottom hook 27 and then turning at corner 40 and returning through return leg 39. The rope 12 now passes through the second eyelet opening 80 at corner 41 with the end leg 42 passing through the locking leg 38 to form the constrictive locking arrangement 18. As such the second eyelet opening 80 serves the same function of opening 19 described above while eliminating the need for device 20 and associated deformation of the rope 12 when securing the device 20 in place.

As to FIG. 10B, an alternate hook 76-1 is provided with the separator bar 77-1 oriented vertically to form the eyelet openings 79-1 and 80-1. The eyelet openings 79-1 and 80-1 are then able to receive the eye splice 35 and the rope corner 41 respectively there through such that the hook 76-1 is readily interchangeable with hook 76.

With the above described arrangements, the locking arrangement 18 is self-locking without the use of separate locking mechanisms and hardware, and also is readily releasable by pulling on the return leg of the loop that is closest to the locking arrangement 18. This tie-down configuration in its various forms as described herein is readily formable yet highly secure for holding tension in the rope of the tie-down.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A tie-down arrangement comprising:
   a length of flexible rope;
   first and second connector sections associated with said rope and each configured for connection to corresponding attachment locations, said tie-down arrangement having a length defined between said first and second connector sections which said tie-down arrangement length is adjustable for tensioning said tie-down arrangement and thereby securing articles;
   a guide arrangement proximate said first connector section having a guide opening which slidably receives said rope; and
   said rope having a fixed rope end associated with said first connector section, a second rope end, and one or more loops formed between said first and second rope ends wherein each said loop has a first leg extending toward said second connector section, a first turn proximate said second connector section, a second leg extending back toward said first connector section and a second turn slidably received through said guide opening wherein said rope extends from said guide opening to define a locking leg which terminates at said second end, said locking leg entering into and extending interiorly through a locking section of said rope and then exiting from said locking section, said locking leg being slidable through said locking section to adjust the length of said tie-down arrangement wherein tensioning of said rope causes said locking section to constrictively grip the portion of said locking leg disposed interiorly therein to prevent slippage of said rope through said locking section.

2. The arrangement according to claim 1, wherein said rope is a plaited rope.

3. The arrangement according to claim 2, wherein said rope is comprised of multiple strands which define multiple plaits and an interior of said rope through which said rope is insertable.

4. The arrangement according to claim 3, wherein said strands constrictively grip said rope disposed interiorly therein.

5. The arrangement according to claim 1, wherein said guide opening is defined by an opening formed through said rope.

6. The arrangement according to claim 5, wherein said guide opening in said rope includes a rigid device secured within said rope.

7. The arrangement according to claim 1, wherein said guide opening is defined by a rigid ring, and each said second turn of each said loop extends slidably there through.

8. The arrangement according to claim 1, wherein said locking leg extends successively from said second turn of said loop wherein said arrangement is tightened by pulling of said second end and sliding of said locking leg through said locking section which generates rope tension and prevents return sliding of said locking leg through said locking section, said arrangement being released by pulling of said second leg of said loop in a longitudinal direction away from said locking section.

9. A tie-down assembly comprising;
a length of flexible rope;
first and second connector sections associated with said rope which define opposite ends of said assembly and are configured for connection to corresponding attachment locations, wherein said tie-down assembly has a length defined between said first and second connector sections which is adjustable for tensioning said tie-down assembly;
a guide arrangement which is disposed proximate said first connector section and has a guide opening through which said rope is slidably received;
said rope having a fixed rope end associated with said first connector section, a free rope end extending freely, and at least one loop formed between said fixed rope end and said free rope end, each said loop having a first leg extending between said first and second connector sections, a first turn slidably engaged with said second connector section, a second leg extending back toward said first connector section and a second turn slidably received through said guide opening wherein pulling of said free rope end pulls said rope through the guide opening to shorten the size of the loop and thereby shorten the distance between the first and second connector sections; and
said free end of said rope extending from said guide opening to define a locking leg wherein said locking leg is inserted into and extends interiorly through a locking section of said rope and then exits from said locking section to terminate at said free end, said locking leg being slidable through said locking section to adjust the length of said tie-down assembly wherein pulling of said free rope end in a tightening direction tensions said rope to cause said locking section to constrictively grip the portion of said locking leg disposed interiorly therein and prevent slippage of said rope through said locking section in a release direction opposite said tightening direction, said constrictive gripping of said rope by said locking section being releasable by longitudinal pulling of said second loop leg in said release direction.

10. The assembly according to claim 9, wherein said rope is comprised of multiple strands which surround said locking leg and constrictively grip said rope when under tension.

11. The assembly according to claim 10, wherein said rope is a plaited rope.

12. The assembly according to claim 9, wherein said first turn slidably extends through an eyelet associated with said second connector section.

13. The assembly according to claim 12, wherein said second connector section includes a hook.

14. The assembly according to claim 9, wherein said locking section is defined in said first leg of said loop and constrictively grips said rope disposed interiorly therein.

15. The assembly according to claim 14, wherein said guide opening is disposed between said locking section and said first connector section.

16. The assembly according to claim 15, wherein said guide opening is defined by a rigid eyelet through which said second turn is slidably received.

17. The assembly according to claim 9, wherein said rope defines a plurality of said loops.

18. A tie-down assembly comprising:
a length of flexible rope;
first and second connector sections associated with said rope which define opposite ends of said assembly and are each configured for connection to corresponding attachment locations, said tie-down assembly having a length defined between said first and second connector sections which said tie-down assembly length is adjustable for tensioning said tie-down arrangement;
said rope having a fixed rope end associated with said first connector section, a free rope end extending freely, and at least one loop formed between said fixed rope end and said free rope end, at least one said loop having a first leg extending toward said second connector section, a first turn slidably engaged with said second connector section, a second leg extending back toward said first connector section and a second turn, said first leg of said loop defining a locking section disposed between said first and second turns thereof, and said tie-down arrangement comprising a guide opening disposed between said first connector section and said locking section and through which said second turn of said loop is slidably received wherein pulling of said free rope end pulls said rope through the guide opening to shorten the size of the loop and thereby shorten the distance between the first and second connector sections; and
said free end of said rope extending from said guide opening to define a locking leg which enters into, extends interiorly through and then exits from said locking section to terminate at said free end, said locking leg being slidable through said locking section wherein pulling of said free rope end in a tightening direction tensions said rope to cause said locking section to constrictively grip the portion of said locking leg disposed interiorly therein, wherein said constrictive gripping of said rope by said locking section is releasable by longitudinal pulling of said second loop leg in an opposite release direction.

19. The assembly according to claim 18, wherein said first and second legs of said loop extend parallel to each other.

20. The assembly according to claim 19, wherein said first and second turns are disposed adjacent said first and second connector sections and said first and second legs extend longitudinally therebetween.

* * * * *